(12) United States Patent
Tanabe et al.

(10) Patent No.: US 6,447,420 B1
(45) Date of Patent: Sep. 10, 2002

(54) POWER TRANSMISSION MECHANISM

(75) Inventors: Sadayuki Tanabe; Tatsuya Narumi, both of Gifu (JP)

(73) Assignee: Teijin Seiki Co., Ltd., Tokyo (JP)

( * ) Notice: Subject to any disclaimer, the term of this patent is extended or adjusted under 35 U.S.C. 154(b) by 0 days.

(21) Appl. No.: 09/574,795

(22) Filed: May 19, 2000

(30) Foreign Application Priority Data

May 20, 1999 (JP) .......................................... 11-139595

(51) Int. Cl.[7] .............................................. F16H 47/04
(52) U.S. Cl. ........................................................ 475/83
(58) Field of Search ............................. 475/72, 73, 83, 475/116, 140, 142; 180/343, 372; 192/87.14, 87.15, 87.16

(56) References Cited

U.S. PATENT DOCUMENTS

| | | | |
|---|---|---|---|
| 2,918,832 A | | 12/1959 | Meyers |
| 3,487,726 A | * | 1/1970 | Burnett ....................... 475/142 |
| 3,717,049 A | * | 2/1973 | Brandt ........................ 475/73 X |
| 4,142,615 A | * | 3/1979 | Sidles, Jr. et al. .......... 74/391 X |
| 4,213,514 A | * | 7/1980 | Ehrlinger et al. .......... 475/83 X |
| 4,287,781 A | | 9/1981 | Zenker |
| 4,450,735 A | * | 5/1984 | Koivunen et al. .......... 475/140 |
| 5,588,931 A | * | 12/1996 | Forster ........................ 475/338 |
| 6,135,259 A | * | 10/2000 | Forster ...................... 475/83 X |
| 6,199,653 B1 | * | 3/2001 | Matsufuji et al. ........ 192/87.15 |

FOREIGN PATENT DOCUMENTS

| | | | |
|---|---|---|---|
| FR | 2 755 155 A1 | 4/1998 | |
| GB | 2264758 A | * 9/1993 | ................ 475/142 |
| JP | 11-82648 | 3/1999 | |

* cited by examiner

Primary Examiner—Charles A Marmor
Assistant Examiner—Roger Pang
(74) Attorney, Agent, or Firm—Akin, Gump, Strauss, Hauer & Feld, L.L.P.

(57) ABSTRACT

A first friction clutch (54) is constructed as a negative type friction clutch and a second friction clutch (55) is constructed as a positive type friction clutch. Spring constant of a second spring (75) is made smaller than that of a first spring (65). Therefore, in the middle stage of switching the first and second friction clutches (54, 55), both of these first and second friction clutches (54, 55) enter in a connection state. Consequently, a driven member (56) is driven through either or both of the first and second clutches by a driving shaft, and the free rotation state does not occur.

7 Claims, 3 Drawing Sheets

POWER TRANSMISSION MECHANISM

BACKGROUND OF THE INVENTION

The present invention relates to power transmission mechanism that transmits driving rotation of a driving shaft to a driven member by any one of two friction clutches thereby to rotate the driven member.

Conventionally, power transmission mechanism as disclosed in, for example, Unexamined Published Japanese Patent Application No. Hei 11-82648 has been known, which transmits driving rotation of a driving shaft to a driven member by either a negative type first friction clutch or a positive type second friction clutch thereby to rotate the driven member.

This power transmission mechanism comprises a plural numbers of first and second friction plates constituting a first friction clutch and a second friction clutch respectively; a common piston that can approach and separate from these first and second friction plates, makes the first friction clutch in a connection state when the piston is pressed against the first friction plate and makes the second friction clutch in connection state when the piston separates from the first friction plate and is pressed against the second friction plate; a spring for energizing the common piston so as to press it against the first friction plate; and a fluid passage capable of giving fluid force by which the piston separates from the first friction plate and approaches the second friction plate to the common piston.

In this power transmission mechanism, when the fluid is not supplied to the fluid passage, since the common piston is pressed against the first friction plate by the energizing force of the spring, the negative type first friction clutch is in connection state. At this time, since the common piston separates from the second friction plate, the positive type second clutch is in cut-off state. Next, when the fluid is supplied to the fluid passage, the common piston separates from the first friction plate in opposition to the spring by the fluid force of the fluid, approaches the second friction plates, and is pressed against the second friction plate. As a result, the first friction clutch is switched from the connection state to the cut-off state, while the second friction clutch is switched from the cut-off state to the connection state.

However, in such the conventional power transmission mechanism, when the first and second friction clutches are switched, for example, when the first friction clutch is switched from the connection state to the cut-off state, and when the second friction clutch is switched from the cut-off state to the connection state, as described before, as the pressure of the supplied fluid increases, the pressing force of the common piston against the first friction plate decreases, so that the piston finally separates from the first friction plate. Thereafter, the common piston moves toward the second friction plate freely for a short time and contacts the second friction plates. Then, since the common piston is pressed against the second friction plate by a large pressing force, there exists a period for which the common piston separates from both of the first and second friction plates.

For the period in which the common piston separates from both of the first and second friction plates, and immediately before and after this period, both the first and second friction clutches are in the cut-off state or are substantially in the cut-off state. Therefore, the driven member is substantially cut off from the driving shaft and rotates freely. Here, if the driven member rotates freely as described before, for example, in case that the above power transmission mechanism is applied to a travel driving apparatus of a civil engineering construction machine, when the civil engineering construction machine stops in the middle of a sloping road, there is a problem that the civil engineering construction machine slips on the sloping road by its own weight for a short time.

SUMMARY OF THE INVENTION

An object of this invention is to provide power transmission mechanism which can prevent free rotation of the driven member at the switching time of first and second friction clutches.

This object can be achieved by power transmission mechanism that transmits driving rotation of a driving shaft to a driven member by either a negative type first friction clutch or a positive type second friction clutch, thereby to rotates the driven member. In this power transmission mechanism, the first friction clutch comprises a plural numbers of first friction plates; a first piston which can approach and separate from the first friction plate, and makes the first friction clutch in connection state when it is pressed against the first friction plate; and a first spring for energizing the first piston so as to press the first piston against the first friction plate. The second friction plate comprises a plural numbers of second friction plates; a second piston which can approach and separate from the second friction plate, and makes the second friction clutch in connection state when it is pressed against the second friction plate; and a second spring for energizing the second piston so as to separate the second piston against the second friction plate, of which spring constant is smaller than that of said first spring. Further, there is provided a fluid passage which can give the first piston to fluid force by which the first piston is separated from the first friction plate and simultaneously can give the second piston to fluid force by which the second piston approaches the second friction plate.

Now, assuming that the fluid is not supplied to the fluid passage and the fluid force is not given to any of the first and second pistons, since the first piston is pressed against the first friction plate by the energizing force of the first spring, the first friction clutch is in the connection state. Therefore, the rotation of the driving shaft is transmitted through the first friction clutch to the driven member, thereby to rotate the driven member. At this time, since the second piston is separated from the second friction plate by the energizing force of the second spring, the second friction clutch is in the cut-off state.

Next, when the fluid is supplied to the fluid passage, the fluid force in the direction opposite to the energizing force of the first spring is given to the first piston. However, this fluid force increase as the pressure of the fluid increases. Therefore, the pressing force given from the first spring to the first friction plate is canceled by this fluid force and reduced, so that the rotational torque transmitted through the first friction clutch becomes small.

At this time, the fluid force in the direction opposite to the energizing force of the second spring is also given to the second piston. However, the spring constant of this second spring is smaller than that of the first spring as described before. Therefore, before the canceled energizing force of the first spring becomes zero, the above fluid force exceeds the energizing force of the second spring, so that the second piston can be pressed against the second friction plate. Hereby, when the first friction clutch transmits the rotational torque by friction resistance, the second friction clutch is switched to the connection state and starts transmitting the rotational torque. Therefore, there exists a period for which the rotational torque is transmitted to the driven member through both of the first and second friction clutches. The rotational torque transmitted to the driven member from the driving shaft is the sum of the rotational torque of the first friction clutch and that of the second friction clutch.

Thereafter, when the fluid force given to the first piston exceeds the energizing force of the first spring, the first piston separates from the first friction plate and the first friction clutch is switched to the cut-off state. As a result, transmission of the rotational torque which has been performed through both of the first and second friction clutches is performed through only the second friction clutch. On the other hand, contrary to the aforementioned, when supply of the fluid to the fluid passage is stopped, in the order opposite to the aforesaid action, the connection state is changed from only the second friction clutch through both the first and second friction clutches to only the first friction clutch.

At the switching time of the first and second friction clutches, and in the middle of switching them, both the first friction clutch and the second friction clutch are in the connection state as described above. Therefore, the driven member is not cut off from the driving shaft and does not rotate freely. As a result, the civil engineering construction machine is prevented from slipping on the sloping road.

Further, according to the second aspect of the invention, the first and second friction plates can be made the same shape. Therefore, a manufacturing cost can be reduced, and the outer diameter can be made the small diameter while the transmission torque of the power transmission mechanism is being secured.

Further, according to the third aspect of the invention, the rotational speed of the driven member can be switched in two stages with a simple structure.

Further, according to the fourth aspect of the invention, the rotational speed of the driven member can be switched in four stages in total with a simple structure.

Furthermore, according to the fifth aspect of the invention, the driving force is dispersed in the axial direction, and the whole structure can be simplified.

The present disclosure relates to the subject matter contained in Japanese patent application No. Hei. 11-139595 (filed on May 20, 1999), which is expressly incorporated herein by reference in its entirety.

DESCRIPTION OF THE PREFERRED EMBODIMENT

Preferred embodiments of the invention will be described below with reference to drawings.

Figure 1:
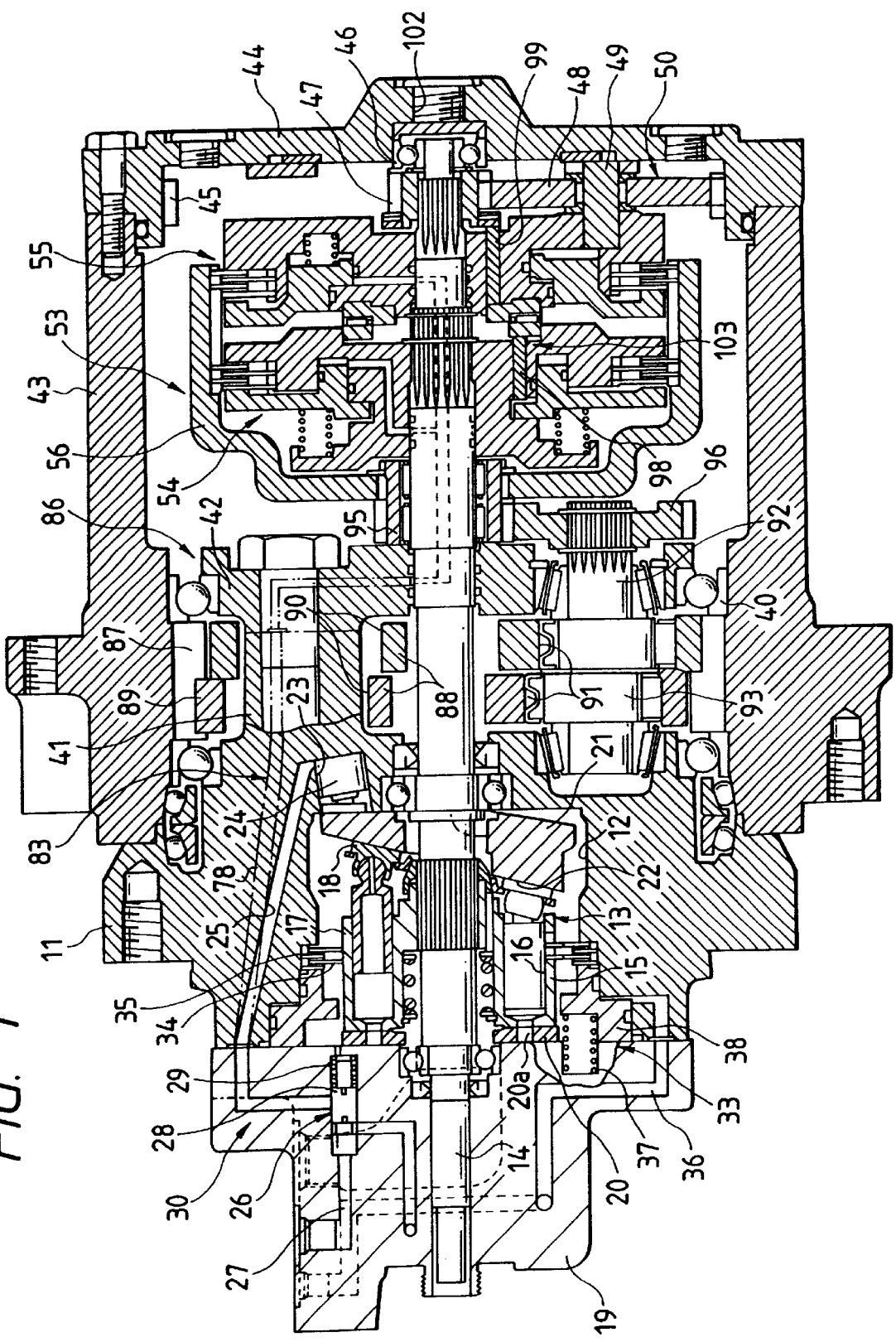
FIG. 1 is a front sectional view showing an embodiment in which the invention is applied to a travel driving apparatus.
Figure 2:
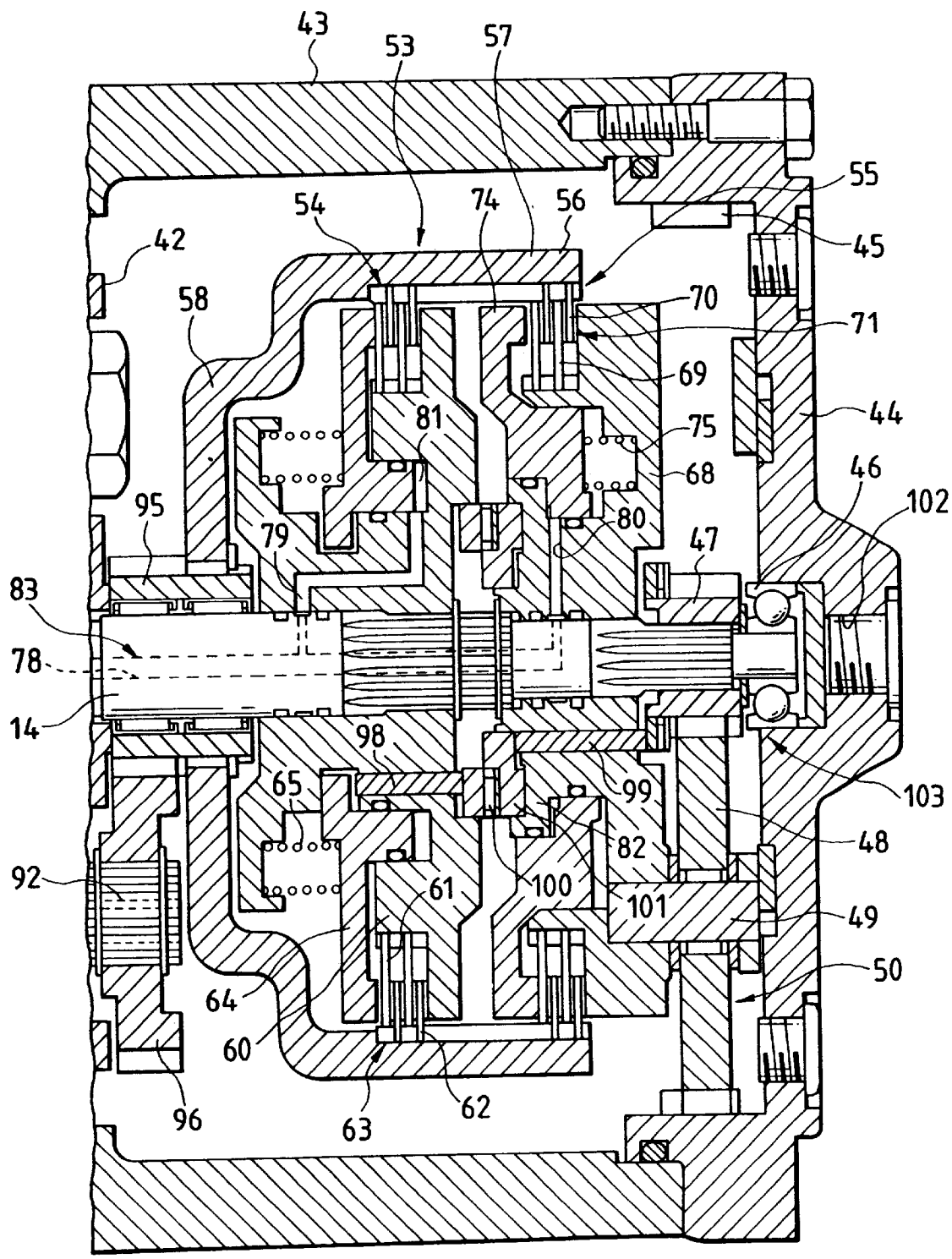
FIG. 2 is a front sectional view in the vicinity of power transmission mechanism according to the embodiment.

In FIGS. 1 and 2, reference numeral 11 is a fixed casing attached to a travel frame of, for example, a civil engineering construction machine, in which there is provided a housing 12 storing therein an oblique plate type fluid motor 13 serving as driving means for drive-rotating a driving shaft 14. The driving shaft 14 is supported rotatably by the fixed casing 11 and one side portion thereof is fitted in the housing 12. The above fluid motor 13 has a cylindrical cylinder block 15 stored in the housing 12, and the driving shaft 14 is inserted into this cylinder block 15 and spline-connected thereto. Plungers 17 are respectively inserted slidably into a plurality of cylinder holes 16 formed in the cylinder block 15, and a shoe 18 is coupled to a leading end of each of these plungers 17.

Reference numeral 19 is a side block which is secured to one end surface of the fixed casing 11 and blocks one end opening of the housing 12, and a pair of supply and discharge passages (not shown) provided in this side block 19 is coupled to the cylinder holes 16 through a supply and discharge hole 20a of a timing plate 20 interposed between the cylinder block 15 and the side block 19. Further, these supply and discharge passages are connected through a switching valve (not shown) to a fluid pump and a tank. By switching the switching valve, one serves as a supplying passage and the other serves as a discharging passage.

Reference numeral 21 is an oblique plate formed substantially in the shape of ring, which is stored in the housing 12 not on the cylinder block 15 side but on the other side. A slant surface 22 is formed on one end surface of this oblique plate 21, and the shoe 18 is brought into slide contact with this slant surface 22. Further, two flat surfaces are formed on the other end surface of the oblique plate 21, and a fulcrum member (not shown) is arranged on a boundary of these flat surfaces. Reference numeral 23 is a cylinder room formed on the other end surface of the housing 12, and a piston 24 that is into contact with the other end surface of a thin portion of the oblique plate 21 is slidably stored in this cylinder room 23.

Reference numeral 25 is a switching passage formed in the fixed casing 11 and the side block 19, of which one end is connected to a fluid pump (not shown) and of which the other end is connected to the cylinder room 23. An opening and closing valve 26 is provided on the way of this switching passage 25. When high-pressure fluid is supplied as a pilot pressure through a pilot passage 27, a spool 28 moves while it compresses a spring 29, whereby this opening and closing valve 26 is opened. On the other hand, when supply of the high-pressure fluid to the pilot passage 27 is stopped, the spool 28 is energized by the spring 29 and moves, so that the valve 26 is closed.

When the piston 24 is protruded and drawn in by opening and closing of the valve 26, the oblique plate 21 is slantingly rotated between two slant rotation positions around the fulcrum member. By this slant rotation of the oblique plate 21, stroke of the plunger 17 in the cylinder block 15 is changed in two stages. Hereby, the output rotational speeds of the cylinder block 15 and the driving shaft 14 are switched in the two stages, so that the number of rotation is widely controlled. The aforementioned driving shaft 14, cylinder block 15, plunger 17, shoe 18, timing plate 20, and oblique plate 21 constitute, as a whole, the fluid motor 13 of which the number of rotation is changed in two stages by the two stages change of the slant rotation position of the oblique plate 21. On the other hand, the aforementioned cylinder room 23, piston 24, switching passage 25, opening and closing valve 26, and pilot passage 27 constitute, as a whole, slant rotation means 30 which rotates the oblique plate 21 slantingly between the two slant rotation positions around the fulcrum member.

Reference numeral 33 is a negative brake for giving braking power to the fluid motor 13 when the fluid motor 13 stops, and it includes a plurality of inner friction plates 34 spline-connected to the outer periphery of the cylinder block 15 and a plurality of outer friction plates 35 spline-connected to the inner periphery of the housing 12 of the fixed casing 11. When the supply of the high pressure fluid to a brake passage 36 is stopped, the outer friction plate 35 is pressed against the inner friction plate 34 by the piston 38 energized by the spring 37 and this negative brake 33 gives the braking power to the cylinder block 15. On the other hand, when the high-pressure fluid is supplied to the brake passage 36 and the piston 38 moves to one side while it compresses the spring 37, the outer friction plate 35 separates from the inner friction plate 34 to permit the rotation of the cylinder block 15.

The above-described fixed casing 11 includes a plurality of cylindrical pole portions 41 at the other end portion, which extend axially and are equally distant from one another in the circumferential direction. A disc-shaped end plate 42 is detachably attached to the other end of each of these pole portions 41. Reference numeral 43 is a hub formed substantially in the shape of cylinder, which is rotatably supported by the fixed casing 11 and the end plate 42 through a pair of bearings 40. A driving wheel of the civil engineering construction machine is coupled to the outer periphery of this hub 43. Reference numeral 44 is a cover formed substantially in the shape of disc, which is secured to the other end of the hub 43 and covers the other end opening of the hub 43. An inner gear 45 is provided at the outer end portion in the direction of radius of this cover 44, and the other end of the driving shaft 14 is rotatably supported through a bearing 46 in the center of this cover 44.

Reference numeral 47 is a sun gear coupled to the other end portion of the driving shaft 14 by a spline so that it can move in the axial direction and rotate integrally with the driving shaft 14. A plurality of planet gears 48 that are distant from one another in the circumferential direction are engaged with this sun gear 47 and the inner gear 45. When the driving shaft 14 rotates, this rotation is transmitted from the sun gear 47 to the planet gears 48 to rotate the planet gears 48 (on their own axes) around a transmission shaft 49 inserted in the center of the planet gears 48. At this time, the inner gear 45 (hub 43, cover 44) engaging with the planet gears 48 rotates at a low speed as described later. Therefore, the planet gears 48 rotate (revolve) around the sun gear 47 at the low speed together with the transmission shaft 49, and this revolution is output to a second friction clutch 55 to be described later. The aforementioned inner gear 45, sun gear 47, and planet gears 48 constitutes, as a whole, a planet gear type reducer 50 which reduces the rotational speed of the sun gear 47 (driving shaft 14) and outputs the reduced rotational speed to the transmission shaft 49.

Reference numeral 53 is power transmission mechanism which is arranged between the reducer 50 and the end plate 42, and dipped in oil filled within the hub 43. This power transmission mechanism 53 includes a negative type first friction clutch 54, a positive type second friction clutch 55 arranged on the other side in the axial direction of the first friction clutch 54, and a driven member 56 to which the rotation is transmitted from any one of these first and second friction clutches 54, 55 to rotate the driven means 56. This driven member 56 comprises a cylinder portion 57 surrounding the first and second friction clutches 54, 55 from the outside in the direction of radius, and a disc portion 58 disposed on one side in the axial direction of the first friction clutch 54.

Here, the first friction clutch 54 includes a first clutch body 60 spline-connected to the driving shaft 14. A plurality of first inner friction plates 61 are spline-connected to the outer periphery of the outer end portion in the direction of radius of this first clutch body 60. Reference numeral 62 is a plurality of first outer friction plates spline-connected to the inner periphery of the cylinder portion 57 of the driven member 56. These first outer friction plates 62 and first inner friction plates 61 are arranged alternately in the axial direction. The aforementioned first inner and outer friction plates 61, 62 constitute a plurality of first friction plates 63 as a whole.

Reference numeral 64 is a first piston which is slidably fitted in the outside of the first clutch body 60 and can approach and separate from the first friction plate 63. Between this first piston 64 and the one end portion of the first clutch body 60, a first spring 65 is interposed, which energizes the first piston 64 with large spring constant so as to press the first piston 64 against the first friction plate 63. When the first piston 64 is pressed against the first friction plate 63, the first inner and outer friction plates 61, 62 are brought into friction contact with each other under high contact pressure. Therefore, the first friction clutch 54 enters in connection state, whereby the rotation of the driving shaft 14 is transmitted to the driven member 56 intactly (without reducing the rotational speed). On the other hand, when the first piston 64 separates from the first friction plate 63, the first friction clutch 54 enters in off state, so that the rotation of the driving shaft 14 is not transmitted to the driven member 56. The aforementioned first clutch body 60, first friction plate 63, first piston 64, and first spring 65 constitute, as a whole, the first friction clutch 54.

On the other hand, the second friction clutch 55 includes a second clutch body 68. This second clutch body 68 is rotatably supported by the driving shaft 14 and the transmission shaft 49 is inserted into the second clutch body 68, whereby the second friction clutch body 68 rotates at the same speed as that of the transmission shaft 49, that is, as the revolution speed of the planet gear 48. As described above, the reducer 50 is arranged between the second friction clutch 55 and the driving shaft 14. A plurality of second inner friction plates 69 are spline-connected to the outer periphery of the outer end portion in the direction of radius of this second clutch body 68. On the other hand, a plurality of second outer friction plates 69 is spline-connected to the inner periphery of the cylinder portion 57 of the driven member 56. These second outer friction plates 70 and second inner friction plates 69 are arranged alternately in the axial direction. The aforementioned second inner and outer friction plates 69, 70 constitute a plurality of second friction plates 71 as a whole.

Here, as described above, in case that the first and second friction clutches 54, 55 are arranged in the axial direction of the driving shaft 14, since these first and second friction plates 63, 71 can be made the same shape, the manufacturing cost can be reduced. Further, while the transmission torque of the power transmission mechanism 53 is being secured, the outer diameter can be made the inner diameter.

Reference numeral 74 is a second piston which is slidably fitted in the outside of the second clutch body 68 and can approach and separate from the second friction plate 71. Between this second piston 74 and the second clutch body 68, a second spring 75 is interposed, which energizes the second piston 74 so as to separate the second piston 74 from the second friction plate 71, and has smaller spring constant than that of the first spring 65. When the second piston 74 is pressed against the second friction plate 71, the second inner and outer friction plates 69, 70 are brought into friction contact with each other under high contact pressure. Therefore, the second friction clutch 55 enters in connection state, whereby the rotation of the driving shaft 14 reduced by the reducer 50 is transmitted to the driven member 56. On the other hand, when the second piston 74 separates from the second friction plate 71, the second friction clutch 55 enters in off state, so that the rotation of the driving shaft 14 is not transmitted to the driven member 56. The aforementioned second clutch body 68, second friction plate 71, second piston 74, and second spring 75 constitute, as a whole, the second friction clutch The driving shaft 14 and the first friction clutch 54 are directly connected to each other, while the plane gear type reducer 50 is arranged between the driving shaft 14 and the second friction clutch 55. Hereby, by switching the first and second friction clutches 54, 55, the rotational speed of the driven member 56 can be switched in two stages with simple structure. Here, since the rotational speed of the driving shaft 14 is switched in the two stages by the fluid motor 13 as described before, the rotational speed of the driven member 56 is switched in four stages in total with simple structure.

Reference numeral 78 is a supply passage formed within the fixed casing 11 and driving shaft 14. Its one end is connected to the fluid pump through a switching valve (not shown), and the other end is divided into two and opened apart from the axial direction of the driving shaft 14 in the outer periphery of the other end portion of the driving shaft 14. Reference numerals 79 and 80 are connection passages respectively formed in the first and second clutch bodies 60, 68. One ends of these connection passages 79, 89 are communicated with the other end of the supply passage 78, and the other ends thereof are communicated with first and second cylinder rooms 81, 82 formed between the first and second clutch bodies 60, 68 and the second pistons 64, 74 which are the same in the pressure receiving area as each other.

As a result, when the high-pressure fluid is supplied to the supply passage 78, the first piston 64 separates from the first friction plate 63 and switches the first friction clutch 54 to the off state, and the second piston 74 presses the second friction plate 71 and switches the second friction clutch 55 to the connection state. On the other hand, when the supply of the high pressure fluid to the supply passage 78 is stopped, the first piston 64 presses the first friction plate 63 and switches the first friction clutch 54 to the connection state, and the second piston 74 separates from the second friction plate 71 and switches the second friction clutch 55 to the off-state. The aforementioned supply passage 78, and connection passages 79, 80 constitute, as a whole, a fluid passage 83 which can give the fluid force by which the first piston 64 separates from the first friction plate 63 to the first piston 64, and the fluid force by which the second piston 74 approaches the second friction plate 71 to the second piston 74.

Between the fluid motor 13 and the power transmission mechanism 53 within the hub 43, there is provided an eccentrically oscillating type reducer 86 which reduces the rotation of the driven member 56 and outputs the reduced rotation to the hub 43. As this result, the first and second friction clutches 54, 55 of the power transmission mechanism 53 are arranged between the reducer 86 and the planet gear type reducer 50. In this arrangement connection, the driving power is dispersed in the axial direction, and the whole structure can be simplified.

The reducer 86 includes a plurality of inner tooth pins 87 provided in the inner circumference of the one end portion of the hub 43. These inner tooth pins 87 extend in the axial direction and are arranged at an equal distance in the circumferential direction. Reference numeral 88 is two pinions stored in the hub 43, each of which is formed in the shape of disc and has outer tooth pins 89 engaging with the inner tooth pins 87 in the outer circumference thereof. The number of the outer tooth pins 89 is smaller slightly than that of the inner tooth pins 87. Further, in each of the pinions 88, there is formed a plurality of through-fitting holes 90 and an axial hole 91. In the fitting holes 90, the pole portions 41 of the fixed casing 11 are fitted. Reference numeral 92 is a plurality of crankshafts extending in parallel with the driving shaft 14, and these crankshafts 92 are rotatably supported by the fixed casing 11 and the end plate 42. Each of the crankshafts 92 includes two eccentric portions 93 which are eccentric to the center axis of the crankshaft 92 in the opposite direction. These eccentric portions 93 are respectively inserted into the axial holes 91 of the pinions 88.

Reference numeral 95 is an outer gear that is rotatably fitted in the other side of the end plate 42 outside of the driving shaft 14. To the other end portion of this outer gear 95, the inner end in the direction of radius of the disc portion 58 of the driven member 56 is coupled, and with one end portion of this outer gear 95, an outer gear 96 fixed to the other end of each crankshaft 92 is engaged. As a result, the rotation of the driven member 56 is transmitted through the outer gears 95, 96 to the crankshafts 92. When the crankshafts 92 rotate around the center axis, the eccentric portions 93 of these crankshafts 92 rotate eccentrically in the axis holes 91 of the pinions 88, so that the pinions 88 are eccentrically revolved. At this time, since the number of the outer tooth pins 89 is slightly smaller than that of the inner tooth pins, the rotation of the hub 43 is largely reduced by the eccentric revolution of the pinion 88 and the hub 43 rotates at a low speed. The aforementioned inner tooth pin 87, pinion 88, crank shaft 92, and outer gears 95, 96 constitute, as a whole, the eccentrically oscillating type reducer 86 which is coupled to the driven member 56 and reduces the rotation of the driven member 56 at a high rate by use of the pinion 88 that eccentrically rotates thereby to output the reduced rotation to the hub 43.

Reference numeral 98 is a first rod, which is slidably inserted into the first clutch body 60 of the first friction clutch 54 and extends in parallel with the driving shaft 14. The other end of this first rod 98 can come into contact with the other end surface of the first piston 64. Reference numeral 99 is a second rod, which is slidably inserted into the second clutch body 68 of the second friction clutch 55 and extends in parallel with the first rod 98. Between one end of this second rod 99 and the other end of the first rod 98, there is provided a pair of middle rings 101 in which a needle bearing 100 is interposed. Reference numeral 102 is a screw hole which is formed in the cover 44 and penetrates the cover.

The screw member is screwed into this screw hole 102, and the bearing 46, sun gear 47, first and second rods 98, 99, and the middle ring 101 are integrally moved to one side. Hereby, when the first piston 64 is moved to one side so as to separate from the first friction plate 63 in opposition to the first spring 65, the negative type first friction clutch 54 that has entered in the connection state is switched to the off-state and driving system closer to the hub 43 than to the driven member 56 are separated from the driving shaft 14, so that the driving system can enter in a free state. The aforementioned first and second rods 98, 99, middle ring 101, and screw hole 102 constitute, as a whole, switching means 103 which switches the negative type first friction clutch 54 to the off-state when the civil engineering construction machine must be pulled because of trouble in engine, oil compression system or the like, thereby to cut off the driving system halfway.

Next, the working of this invention in the first mode will be described.

It is now assumed that the high-pressure fluid is supplied through one supply and discharge passage to any one of the cylinder holes 16 and the plunger 17 in the cylinder hole 16 is protruded toward the oblique plate 21 to be pressed against the slant surface 22. At this time, since the leading end of the plunger 17 is brought into slide contact with the slant surface 22 through the shoe 18, a component of the pressing force in the circumferential direction acts on the plunger 17. Hereby, the plunger 17 and the shoe 18 slide on the slant surface 22 thereby to drive and rotate the plunger 17, cylinder block 15 and driving shaft 14 integrally. Further, the high pressure fluid supplied to the brake passage 36 moves the piston 38 to one side in such a manner that the piston 38 is separated from the outer friction plate 35 in opposition to the spring 37, so that the driving shaft 14 is released from the braking power of the negative brake 33.

Here, in case that it is desired that the hub 43 is rotated at the maximum number of rotation, the largest amount of the high pressure fluid is supplied to the cylinder hole 16 of the fluid motor 13, and also the slant plate 21 is slant-rotated in the direction in which the slant rotation angle becomes small thereby to shorten the stroke of the plunger 17. Hereby, in cooperation with supply of the largest amount of the high-pressure fluid, the number of rotations of the cylinder block 15 and driving shaft 14 becomes largest. Here, in order to slant-rotate the oblique plate 21 in the direction in which the slant rotation angle of the oblique plate 21 becomes small as described above, the opening and closing valve 26 is opened by the high pressure fluid supplied through the pilot passage 27, whereby the high pressure fluid within the switching passage 25 is guided to the cylinder room 23 and the piston 24 is protruded to one side.

At this time, the high-pressure fluid is not supplied to the fluid passage 83, and the fluid force is not given to any of the first and second pistons 64, 74. Therefore, the first piston 64 is pressed against the first friction plate 63 by the energizing force of the first spring 65 and the first friction clutch 54 enters in the connection sate. On the other hand, the second piston 74 is separated from the second friction plate 71 by the energizing force of the second spring 75, and the second friction clutch 55 enters in the off state. As this result, the rotation of the driving shaft 14 is not reduced, and is transmitted through the first friction clutch 54 and to the driven member 56 and the outer gear 95 of the reducer 86. Thereafter, the rotation of this outer gear 95 is reduced by the reducer 86 at the high rate and the reduced rotation is output to the hub 43 thereby to rotate the hub 43 at the maximum number of rotation.

Next, in case that it is desired that the hub 43 is rotated at the minimum number of rotation, the smallest amount of the high pressure fluid is supplied to the cylinder hole 16 of the fluid motor 13, and also the slant plate 21 is slant-rotated in the direction in which the slant rotation angle becomes large thereby to lengthen the stroke of the plunger 17. Hereby, in cooperation with supply of the largest amount of the high-pressure fluid, the number of rotations of the cylinder block 15 and driving shaft 14 becomes smallest. Here, in order to slant-rotate the oblique plate 21 in the direction in which the slant rotation angle of the oblique plate 21 becomes small as described above, the supply of the high pressure fluid to the cylinder room 23 is stopped by switching the opening and closing valve 26 to closing, and the piston 24 is drawn into the cylinder room 23 by the pressing force of the plunger 17 against the oblique plate 21.

At the same time, the high-pressure fluid is supplied through the fluid passage 83 to the first and second cylinder rooms 81, 82 simultaneously. As this result, the fluid force in the direction opposite to the energizing force of the first spring 65 is given to the first piston 64 by this high-pressure fluid. However, this fluid force increases as the pressure of the fluid increases. Therefore, the friction force given to the first friction plate 63 through the first piston 64 by the first spring 64 is canceled by this fluid force and reduced, so that the rotational torque transmitted through the first friction clutch 54 becomes small.

At this time, the fluid force in the direction opposite to the energizing force of the second spring 75 is given also to the second piston 74 by the above fluid. However, since the spring constant of the second spring 75 is smaller than that of the first spring 65 as described before, before the canceled energizing force of the first spring 65 becomes zero (before the first friction clutch 54 is switched to the off-state), the fluid force given to the second piston 74 exceeds the energizing force of the second spring 75, so that the second piston 74 is pressed against the second friction plate 71.

Hereby, the second friction clutch 55, while the first friction clutch 54 transmits the rotational torque by the friction resistance, is switched from the off-state to the connection state and starts transmitting the rotational torque, so that the rotational torque is transmitted through both the first and second friction clutches 54, 55. At this time, the rotation of the driving shaft 14 is reduced by the reducer 50 at the high rate, and thereafter it is transmitted even through the second friction clutch 55 to the driven member 56. However, the transmission torque increases as the pressure of the high-pressure fluid increases. At this time, the rotational torque transmitted from the driving shaft 14 to the driven member 56 is the sum of the rotational torque of the first friction clutches 54 and that of the second friction clutch 55.

Thereafter, when the pressure of the high pressure fluid supplied to the fluid passage 83 increases and the fluid force given to the first piston 64 exceeds the energizing force of the first spring 65, the first piston 64 separates from the first friction plate 63 and the first friction clutch 54 is switched to the off-state. As this result, transmission of the rotational torque performed through both the first and second clutches 54, 55 is then performed through only the second friction clutch 55. Here, since the planet gear type reducer 50 is interposed between the second friction clutch 55 and the driving shaft 14, the hub 43 rotates at the smallest number of rotation.

On the other hand, contrary to the above description, when the supply of the fluid to the fluid passage 83 is stopped, by order opposite to in the aforementioned working, not the second friction clutch 55 but both the first and second friction clutches 54, 55 enter in the connection state, and then only the first friction clutch 54 enters in the connection state.

As described above, at the time of switching the first and second friction clutches 54, 55 and in the middle stage of switching them, both the first and second friction clutches 54, 55 enter in the connection state. Therefore, the driven member 56 is not cut off from the driving shaft 14 and does not rotate freely, so that the civil engineering construction machine is prevented from slipping on the sloping road and safety becomes higher. Further, as described above, reduction range can be widened considerably by changing the slant rotation angle of the oblique plate 21 and switching the first and second friction clutches 54, 55. Therefore, this apparatus is suitable for an asphalt finisher or the like which requires speed control in a wide range.

In the above mode, the planet gear type reducer 50 is arranged between the second friction clutch 55 and the driving shaft 14. However, in the invention, it may be arranged between the first friction clutch and the driving shaft.

Figure 3:
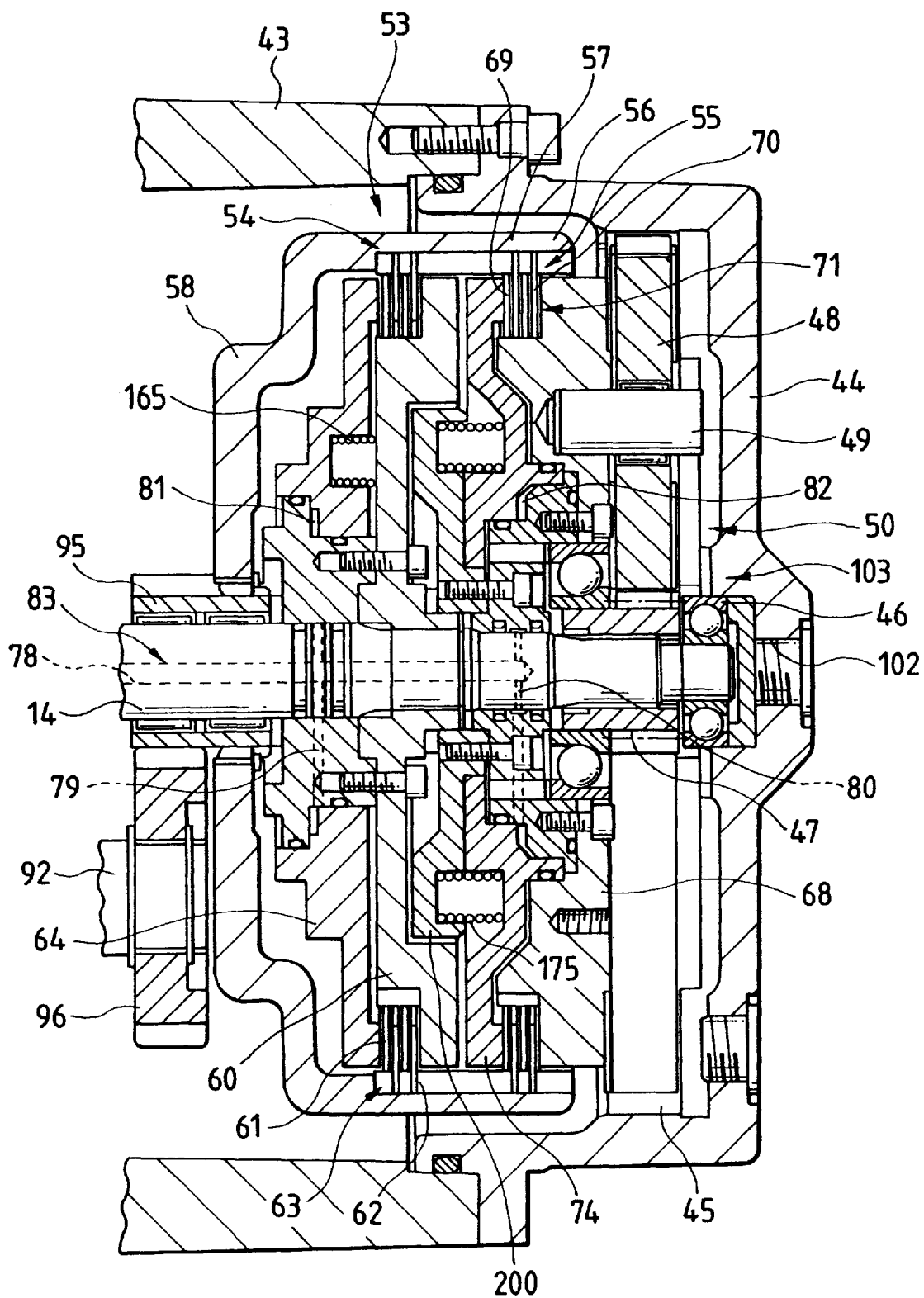
FIG. 3 is a front sectional view in the vicinity of power transmission mechanism according to another embodiment.

FIG. 3 shows another embodiment of the present invention. The power transmission mechanism according to this embodiment is designed, in contrast to the former embodiment, such that when the fluid force is supplied, the first friction clutch 54 is switched to the connection state and the second friction clutch 55 is switched to the off state, and when the fluid force is not supplied, the first friction clutch 54 is switched to the off state and the second friction clutch 55 is switched to the connection state. In FIG. 3, reference numeral 200 designates a support member which is integrated to the second clutch body 68 and which supports the second spring 175 between the support member 200 and the second piston 74. Reference numeral 165 designates a first spring which is interposed between the first clutch body 60 and the first piston 64 and which is smaller in spring constant than the second spring 175.

When the high-pressure fluid is supplied through the fluid passage 83 and the connection passages 79 and 80 to the first and second cylinder rooms 81 and 82, the fluid force is given to the first and second pistons 64, 74. Therefore, the first piston 64 is pressed against the first friction plate 63 while compressing the first spring 165 and the first friction clutch 54 enters in the connection state. On the other hand, the second piston 74 is separated from the second friction plate 71 while compressing the second spring 175, and the second friction clutch 55 enters in the off state. Consequently, the rotation of the driving shaft 14 is not reduced, and is transmitted through the first friction clutch 54 to the driven member 56 and the outer gear 95 of the reducer 86.

When the supply of the high-pressure fluid to the fluid passage 83 is inhibited, the fluid force acting on the first piston 64 decreases gradually, and the first piston is gradually separated from the first friction plate 63 by action of the first spring 165, so that the rotational torque transmitted through the first friction clutch 54 becomes small.

Concurrently, the fluid force acting on the second piston 74 gradually decreases and the second piston 74 is gradually pressed against the second friction plate 71 by the action of the second spring 175, so that the rotational torque transmitted through the second friction clutch 55 becomes large. In this case, since the spring constant of the second spring 175 is larger than that of the first spring 165, the second friction clutch 55 is switched from the off state to the connection state prior to the complete disconnection of the first friction clutch 54.

That is, the second friction clutch 55, while the first friction clutch 54 transmits the rotational torque by the friction resistance, is switched from the off-state to the connection state and starts transmitting the rotational torque, so that the rotational torque is transmitted through both the first and second friction clutches 54, 55. At this time, the rotation of the driving shaft 14 is reduced by the reducer 50 at the high rate, and thereafter it is transmitted even through the second friction clutch 55 to the driven member 56. However, the transmission torque increases as the pressure of the high-pressure fluid decreases. At this time, the rotational torque transmitted from the driving shaft 14 to the driven member 56 is the sum of the rotational torque of the first friction clutch 54 and that of the second friction clutch 55.

Thereafter, when the pressure of the high pressure fluid supplied to the fluid passage 83 decreases and the fluid force given to the first piston 64 becomes lower than the energizing force of the first spring 165, the first piston 64 separates completely from the first friction plate 63 and the first friction clutch 54 is switched to the off-state. As this result, transmission of the rotational torque performed through both the first and second clutches 54, 55 is then performed through only the second friction clutch 55. Here, since the planet gear type reducer 50 is interposed between the second friction clutch 55 and the driving shaft 14, the hub 43 rotates at the reduced number of rotation.

When the high pressure fluid is supplied to the fluid passage 83 again, the first piston 64 starts moving toward the first friction plate 63 against the biasing force of the first spring 165, and then the second piston 68 starts moving away from the second friction plate 71 against the biasing force of the second spring 175 since the first spring 165 is smaller in spring constant than the second spring 175 and the fluid force of the same value acts on the first and second pistons 64 and the 68. Consequently, the first clutch 54 is switched to the connection state prior to the complete disconnection of the second clutch 55.

As described above, according to the invention, it is possible to prevent the driven member from freely rotating when the first and second friction clutches are switched from one to the other for toque transmission.

What is claimed is:

1. A power transmission mechanism for transmitting driving rotation of a driving shaft to a driven member, comprising:
    a first friction clutch including:
        a plurality of first friction plates;
        a first piston movable toward and away from the first friction plates, and placing the first friction clutch in a connection state when the first piston is pressed against the first friction plates; and
        a first spring energizing the first piston so as to press the first piston against the first friction plates,
    a second friction clutch including:
        a plurality of second friction plates;
        a second piston movable toward and away from the second friction plates, and placing the second friction clutch in a connection state when the second piston is pressed against the second friction plates; and
        a second spring energizing the second piston so as to separate the second piston from the second friction plates, wherein the second spring is smaller in spring constant than the first spring, and
        a fluid passage which can simultaneously apply fluid force to both of the first and second pistons so that the first piston receives fluid force in a direction in which the first piston is separated from the first friction plates and the second piston receives fluid force in a direction in which the second piston is pressed against the second friction plates.

2. The power transmission mechanism according to claim 1, wherein said first friction clutch and second friction clutch are arranged in an axial direction of the driving shaft.

3. The power transmission mechanism according to claim 1, further comprising:
    a planet gear-type reducer disposed between said driving shaft and one of the first and second friction clutches so that rotation of the driven member can be switched in two stages.

4. The power transmission mechanism according to claim 3, further comprising:

an oblique plate type fluid motor that is used as driving means for drive-rotating the driving shaft, and that is capable of switching rotation speed of the driving shaft in two stages.

5. The power transmission mechanism according to claim 3, wherein when the first clutch is in connection state, rotation of the driving shaft is transmitted directly to the driven member and when the second clutch is in connection state, rotation of the driving shaft is transmitted through the planet gear-type reducer to the driven member.

6. The power transmission mechanism according to claim 3, wherein when the first clutch is in connection state, rotation of the driving shaft is transmitted through the planet gear type reducer to the driven member, and when the second clutch is in connection state, rotation of the driving shaft is transmitted to the driven member without the planet gear type reducer.

7. A power transmission mechanism for transmitting driving rotation of a driving shaft to a driven member comprising:

a first friction clutch including:
  a plurality of first friction plates;
  a first piston movable toward and away from the first friction plates and placing the first friction clutch in a connection state when the first piston is pressed against the first friction plates; and
  a first spring energizing the first piston so as to press the first piston against the first friction plates, a second friction clutch including:
  a plurality of second friction plates;
  second piston movable toward and away from the second friction plates, and placing the second friction clutch in a connection state when the second piston is pressed against the second friction plates;
  a second spring energizing the second piston so as to separate the second piston from the second friction plates, wherein the second spring is smaller in spring constant than the first spring;

a planet gear-type reducer disposed between said driving and one of the first and second friction clutches so that rotation of the driven member can be switched in two stages;

an eccentrically oscillating type reducer coupled to the driven member to reduce rotational speed of the driven member, wherein the first and second friction clutches are arranged between the eccentrically oscillating type reducer and said planet gear type reducer; and a fluid passage which can simultaneously apply fluid force to both of the first and second pistons so that the first piston receives fluid force in a direction in which the first piston is separated from the first friction plates and the second piston receives fluid force in a direction in which the second piston is pressed against the second friction plates.

* * * * *